United States Patent
Hosking et al.

(10) Patent No.: US 9,058,569 B2
(45) Date of Patent: *Jun. 16, 2015

(54) SYSTEM AND METHOD FOR MAINTENANCE PLANNING AND FAILURE PREDICTION FOR EQUIPMENT SUBJECT TO PERIODIC FAILURE RISK

(71) Applicant: International Business Machines Corporation, Armonk, NY (US)

(72) Inventors: Jonathan R. Hosking, Scarsdale, NY (US); Jayant R. Kalagnanam, Tarrytown, NY (US); Yada Zhu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/751,298

(22) Filed: Jan. 28, 2013

(65) Prior Publication Data

US 2014/0163936 A1 Jun. 12, 2014

Related U.S. Application Data

(63) Continuation of application No. 13/710,920, filed on Dec. 11, 2012.

(51) Int. Cl.
*G06F 17/10* (2006.01)
*G06Q 10/04* (2012.01)
(Continued)

(52) U.S. Cl.
CPC ............ *G06Q 10/04* (2013.01); *G06Q 10/0635* (2013.01); *G06Q 10/20* (2013.01)

(58) Field of Classification Search
CPC .................................................. G06Q 10/0635
USPC ............................................................. 703/2
See application file for complete search history.

(56) References Cited

U.S. PATENT DOCUMENTS

| 6,738,748 B2 | 5/2004 | Wetzer |
| 7,072,841 B1 | 7/2006 | Pednault |

(Continued)

FOREIGN PATENT DOCUMENTS

| JP | 2006327361 A | 12/2006 |
| JP | 2008033908 A | 2/2008 |
| JP | 2009005437 A | 1/2009 |

OTHER PUBLICATIONS

Hokstad; The failure intensity process and the formulation of reliability and maintenance models; Reliability Engineering and System Safety 58 (1997) 69-82.*

(Continued)

*Primary Examiner* — Hugh Jones
(74) *Attorney, Agent, or Firm* — Daniel P. Morris; Ryan, Mason & Lewis, LLP

(57) ABSTRACT

Systems and methods for failure prediction and maintenance planning are provided. A system for failure prediction and maintenance planning, comprises a statistical modeling module comprising a periodic impact evaluation module capable of identifying periodic effects on the failure risk, a balance equation systems module capable of constructing balance equations with respect to phases of failure times, and an initial phase estimation module capable of estimating an unknown initial phase, wherein one or more of the modules are implemented on a computer system comprising a memory and at least one processor coupled to the memory.

15 Claims, 6 Drawing Sheets

(51) Int. Cl.
*G06Q 10/06* (2012.01)
*G06Q 10/00* (2012.01)

(56) References Cited

U.S. PATENT DOCUMENTS

| | | | |
|---|---|---|---|
| 7,383,157 | B1 | 6/2008 | Park et al. |
| 2002/0188496 | A1 | 12/2002 | Feldman et al. |
| 2004/0122625 | A1 | 6/2004 | Nasser et al. |
| 2004/0193467 | A1 | 9/2004 | Williams et al. |
| 2005/0257078 | A1* | 11/2005 | Bose et al. .......... 714/1 |
| 2005/0262394 | A1 | 11/2005 | Yasukawa et al. |
| 2006/0080062 | A1* | 4/2006 | Bose et al. .......... 702/186 |
| 2008/0126171 | A1 | 5/2008 | Baldwin et al. |
| 2009/0313090 | A1 | 12/2009 | Armstrong et al. |
| 2011/0087517 | A1 | 4/2011 | Abbott |

OTHER PUBLICATIONS

Trindade: Analysis of Field Data for Repairable Systems; Trindade7x24 Exchange 2006 Fall Conference Scottsdale, Arizona; 2006; 58 pages.*
Rausan: System Reliability Theory Models and Statistical Methods; A John Wiley & Sons, Inc., Publication; 641 pages; 2004.*
Lees: Chapter 7: "Reliability Engineering" in Lees' Loss Prevention in the Process Industries, Third Edition: Hazard Identification, Assessment and Control; Butterworth-Heinemann; Publication Date: Jan. 10, 2005; 71 pages.*
anon: Military Handbook Electronic Reliability Design Handbook; MIL-HDBK-338B; 1046 pages; 1998.*
Srivastava: Life Tests with Periodic Change in the Scale Parameter of a Weibull Distribution; IEEE Transactions on Reliability, vol. R-23, No. 2, Jun. 1974; pp. 115-118.*
Tan et al.: Hazard function modeling using cross validation: from data collection to model selection; Reliability Engineering and System Safety 49 (1995) 155-169.*
PCT International Search Report and Written Opinion, dated Apr. 9, 2014, for counterpart PCT Application PCT/US2013/061637.
Y.-H. Cheng et al., "Study on Rolling Stock Maintenance Strategy and Spares Parts Management," World Congress on Railroad, railway-research.org, 2006, 18 pages.
J. Zuo et al., "Analysis of Window-Observation Recurrence Data," Technometrics, May 2008, pp. 128-143, vol. 50, No. 2.
Y. Wang et al., "Prediction Models for Annual Break Rates of Water Mains," Journal of Performance of Constructed Facilities, Jan./Feb. 2009, pp. 47-54, vol. 23, No. 1.
Y. Zhao et al., "Fisher Information in Window Censored Renewal Process Data and Its Applications," Annals of the Institute of Statistical Mathematics, Aug. 2011, pp. 791-825, vol. 63, No. 4.
Enrique E. Alvarez, "Smoothed Nonparametric Estimation in Window Censored Semi-Markov Processes," Journal of Statistical Planning and Inference, May 2005, pp. 209-229, vol. 131, No. 2.

\* cited by examiner

SYSTEM AND METHOD FOR MAINTENANCE PLANNING AND FAILURE PREDICTION FOR EQUIPMENT SUBJECT TO PERIODIC FAILURE RISK

CROSS-REFERENCE TO RELATED APPLICATION

This application is a Continuation of U.S. application Ser. No. 13/710,920, filed on Dec. 11, 2012, the disclosure of which is incorporated herein in its entirety by reference.

TECHNICAL FIELD

The field generally relates to systems and methods for maintenance planning and failure prediction for equipment subject to periodic failure risk, and more particularly, to systems and methods which model impacts of periodic variation of risk and limited observation time on the life of an asset.

BACKGROUND

Equipment subject to failure includes, but is not limited to, water mains, water or gas pipes, fire hydrants, tunnels, bridges and electrical power subsystems and transmission lines. The societal impacts of equipment failures are well known. For example, a water main failure can result in unavailability of water supply, water losses, road closures and water contamination. Thus, the prevention of equipment failure and efficient maintenance of equipment has been one of the considerable infrastructure issues facing city and municipal authorities.

Traditionally, municipalities have taken reactive actions in repairing, rehabilitating and replacing deteriorated public facilities. However, with the recent availability of geographic information systems, e.g., products from CARIS (Computer Aided Resource Information Systems) and computer-based maintenance management systems, e.g., NEXGEN® Asset Management 2011, an increasing number of municipalities have started to collect equipment failure and maintenance records, build models for predicting breakage of equipment, and plan proactive maintenance interventions.

As an example, maintenance systems have begun to store data on water pipes, for example, diameter, material, failure times and causes, in databases, and have started using this data to estimate the mean residual life of each item of equipment for preventive replacement and planning purposes. Given the lack of past record keeping, a length (e.g., 8 years) of an observation window (i.e., time duration during which maintenance actions on equipment are recorded in a database) is short compared to the average service life of the equipment (e.g., 100 years in the case of water pipes). Information on failures that occurred before the start of the observation windows is typically not available.

SUMMARY

In general, exemplary embodiments of the invention include systems and methods for maintenance planning and failure prediction for equipment subject to periodic failure risk and, in particular, systems and methods which model impacts of periodic variation of risk and limited observation time on the life of an asset.

According to an exemplary embodiment of the present invention, a system for failure prediction for equipment subject to periodically varying failure risk, comprises a statistical modeling module comprising a periodic impact evaluation module capable of identifying periodic effects on the failure risk, a balance equation systems module capable of constructing balance equations with respect to phases of failure times, and an initial phase estimation module capable of estimating an unknown initial phase, wherein one or more of the modules are implemented on a computer system comprising a memory and at least one processor coupled to the memory.

The statistical modeling module may further comprise a periodic impact modeling module capable of modeling the periodic patterns using a Fourier series, and a failure time distribution modeling module capable of modeling a hazard rate with the periodic patterns.

The statistical modeling module may further comprise a discrepancy measure module capable of constructing a measure of discrepancy between actual and modeled failure times.

Parameters of the periodic patterns may be estimated by evaluating the measure of discrepancy. The periodic effects may be identified based on a Fourier transformation of failure intensity. The periodic effects may be due to at least one of environmental or operational conditions collected during a time period.

The unknown initial phase may be the phase at the start of the time period.

The system may further comprise an optimization module connected with the statistical modeling module and capable of receiving failure prediction data from the statistical modeling module. The optimization module may be capable of optimizing the failure prediction data, wherein the optimization module outputs the optimized failure prediction data for transmission to at least one of a capital planning module, a spare parts demand module, and a maintenance scheduling module.

The system may further comprise a data center and an optimization module connected with the data center, wherein the optimization module is capable of optimizing data from the data center, and outputting the optimized data for transmission to at least one of a capital planning module, a spare parts demand module, and a maintenance scheduling module. The data from the data center may include at least one of spare parts data, supplier data and growth plan data.

According to an exemplary embodiment of the present invention, a method for failure prediction for equipment subject to periodically varying failure risk comprises identifying periodic effects on the failure risk and modeling periodic patterns, modeling failure times with the periodic patterns, constructing balance equations with respect to phases of the failure times, and estimating an unknown initial phase, wherein one or more steps of the method are performed by a computer system comprising a memory and at least one processor coupled to the memory.

The periodic patterns may be modeled using a Fourier series. Modeling the failure times may comprise modeling a hazard rate with the periodic patterns.

The method may further comprise constructing a measure of discrepancy between actual and modeled failure times, estimating parameters of the periodic patterns by evaluating the measure of discrepancy, and predicting reliability of the equipment.

The method may further comprise evaluating reliability of parts from at least one of a plurality parts suppliers and a plurality of parts models, optimizing selection of at least one of the plurality of parts suppliers and the plurality of parts models, and ordering the parts based on at least one of said evaluating and said optimizing.

The method may further comprise determining short and long term spare parts demand, and ordering the spare parts based on said determining.

The periodic effects may be identified based on a Fourier transformation of failure intensity, and may be due to at least one of environmental or operational conditions collected during a time period. The unknown initial phase may be the phase at the start of the time period.

According to an exemplary embodiment of the present invention, an article of manufacture comprises a computer readable storage medium comprising program code tangibly embodied thereon, which when executed by a computer, performs method steps for failure prediction for equipment subject to periodically varying failure risk, the method steps comprising identifying periodic effects on the failure risk and modeling periodic patterns, modeling failure times with the periodic patterns, constructing balance equations with respect to phases of the failure times, and estimating an unknown initial phase.

According to an exemplary embodiment of the present invention, an apparatus for failure prediction for equipment subject to periodically varying failure risk comprises a memory, and a processor coupled to the memory and configured to execute code stored in the memory for identifying periodic effects on the failure risk and modeling periodic patterns, modeling failure times with the periodic patterns, constructing balance equations with respect to phases of the failure times, and estimating an unknown initial phase.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for maintenance planning and failure prediction for equipment subject to periodic failure risk, and more particularly, to systems and methods which model impacts of periodic variation of risk and limited observation time on the life of an asset. This invention may, however, be embodied in many different forms and should not be construed as limited to the embodiments set forth herein.

Efficient estimation of failure risk for equipment in a system can lead to cost effective maintenance programs and prevention of catastrophic equipment failure. While water mains and pipes are discussed herein, it is to be understood that the embodiments of the present invention are not limited to water mains and pipes, and can be applied to any type of equipment for which failure might occur, including, but not limited to, power subsystems and transmission lines, railways, bridges, tunnels, telecommunications equipment, oil production equipment, medical equipment, software and client-server systems.

Various factors may affect system failure, such as the features of the equipment, including, for example, material, dimensions, models, etc., the level of usage, operating conditions, such as, for example, cyclical demand patterns, pressure, etc. and environmental conditions, such as, for example, seasonal change of weather, temperature, etc.

Figure 1:
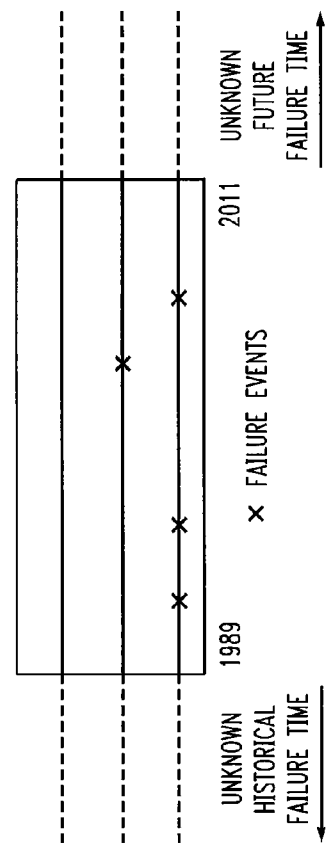
FIG. 1 is a chart showing failure events for Cambridge, Canada water mains over a 23 year window of data recordation.

As can be seen from the following Table 1, and the chart in FIG. 1 showing failure events for Washington, D.C. water mains over a 7 year window of data recordation, and for Cambridge, Canada water mains over a 23 year window of data recordation, the embodiments of the present invention are designed to address difficulties in failure prediction, including field failure and maintenance data being collected over a limited time, lost failure history prior to the data collection starting point, and the small number of failure events within an observation window.

TABLE 1

| | Water Mains | |
|---|---|---|
| | DC Water | Cambridge |
| Ave. service life | 100 years | 80 years |
| Observation window | 2002-2009 (7 years) | 1989-2011 (23 years) |

Further, the embodiments of the present invention provide efficient modeling and estimation methods to address the periodic operating and/or environmental conditions for given equipment, and that the distribution of the subsequent failure times may not be identical, for example, due to different initial phase values of the periodic patterns. Embodiments of the present invention also address difficulties in planning maintenance activities such as responding to the short-term demand variations, for example due to changes of the failure intensity.

Figure 2:
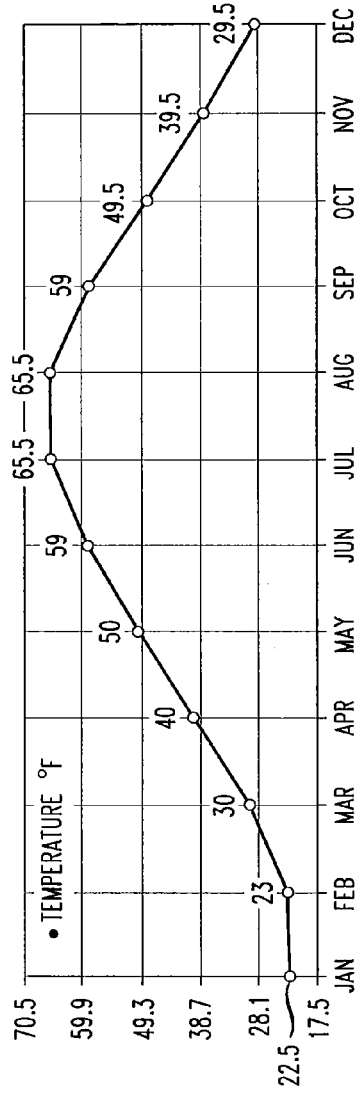
FIG. 2 is a graph of average temperatures in the city of Cambridge, Canada over a one-year period.
Figure 3:
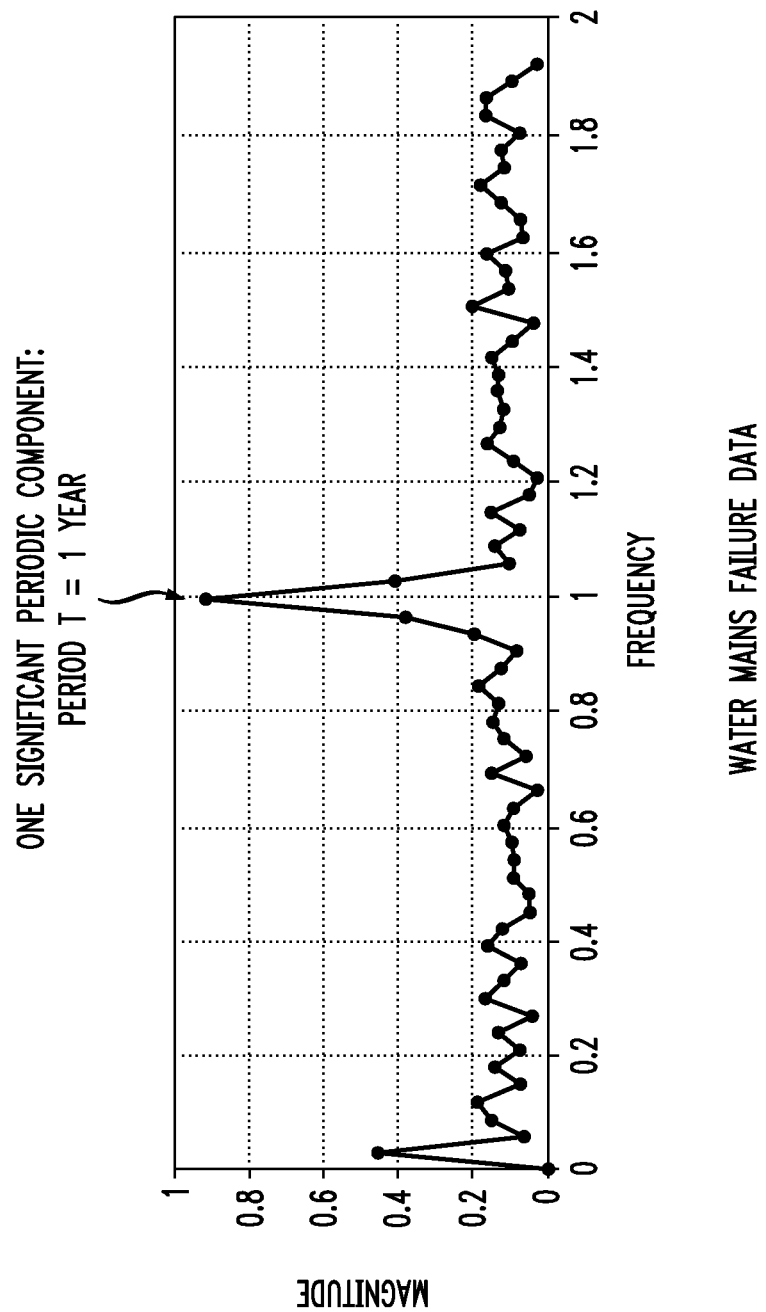
FIG. 3 is a graph of the Fourier transformation of failure intensity for water main equipment in Cambridge according to an exemplary embodiment of the invention.

FIG. 2 is a graph of average temperatures in the city of Cambridge, Canada over a one-year period, and FIG. 3, is a graph of the Fourier transformation of failure intensity for water main equipment in Cambridge. As can be seen by the single peak at the frequency of 1 cycle/year in FIG. 3, there is a high occurrence of failure at one point during the year. In other words, the peak shows that the failure of the system has a high periodicity at a particular point over the time period, such as, for example, during months of the year when the temperature is low.

The embodiments of the present invention model the impact of the limited observation window, and of periodic variation of risk, for example in environmental conditions, such as temperature, and/or in operational conditions, on the life of the equipment. As will be described further below, modeling of the periodic impacts is performed through a hazard/intensity function using a Fourier series, by constructing the global balance equation for the phases of the failure times, by estimating the initial phase at the window starting point based on the global balance equation, and by estimating the parameters of the failure time distribution and the periodic patterns based on a discrepancy measure of the model and the data.

As a result, any periodic patterns can be represented without being restricted to a lack of memory assumptions, the efficiency of failure predictions and the reliability of decisions for maintenance planning can be improved, more accurate estimation of spare parts demand for both short and long term maintenance activities can be performed, initial infrastructure conditions at the window starting points can be estimated, and information from all observation windows, including those in which there were no failures or in which the failure processes were not recorded, can be utilized.

According to an embodiment, as described in further detail below, a mathematical model can represent the impact of environmental and/or operational conditions in terms of K, i.e., the number of failures of equipment. In addition, a mathematical model and its likelihood function can be used to jointly estimate parameters of the model, which are related to both the distribution of K and the distributions of inter-recurrence intervals. An inter-recurrence interval refers to a time interval between two different failures. The likelihood function may represent that the distributions of inter-recurrence intervals are not necessarily identical and can depend on covariate information associated with a component or its history.

Figure 4:
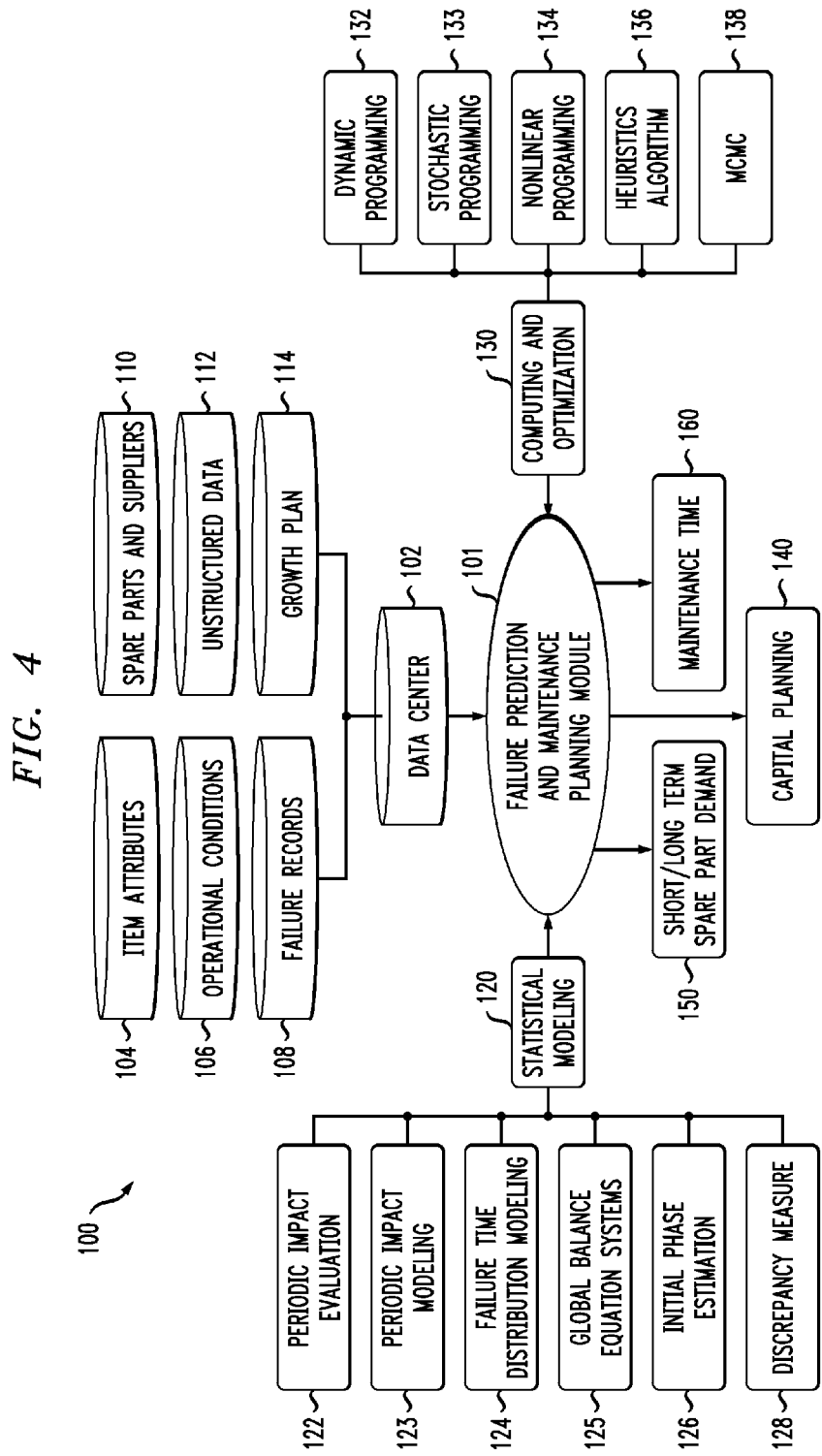
FIG. 4 is a high-level diagram of a system for failure prediction and maintenance planning according to an exemplary embodiment of the invention.
Figure 5:
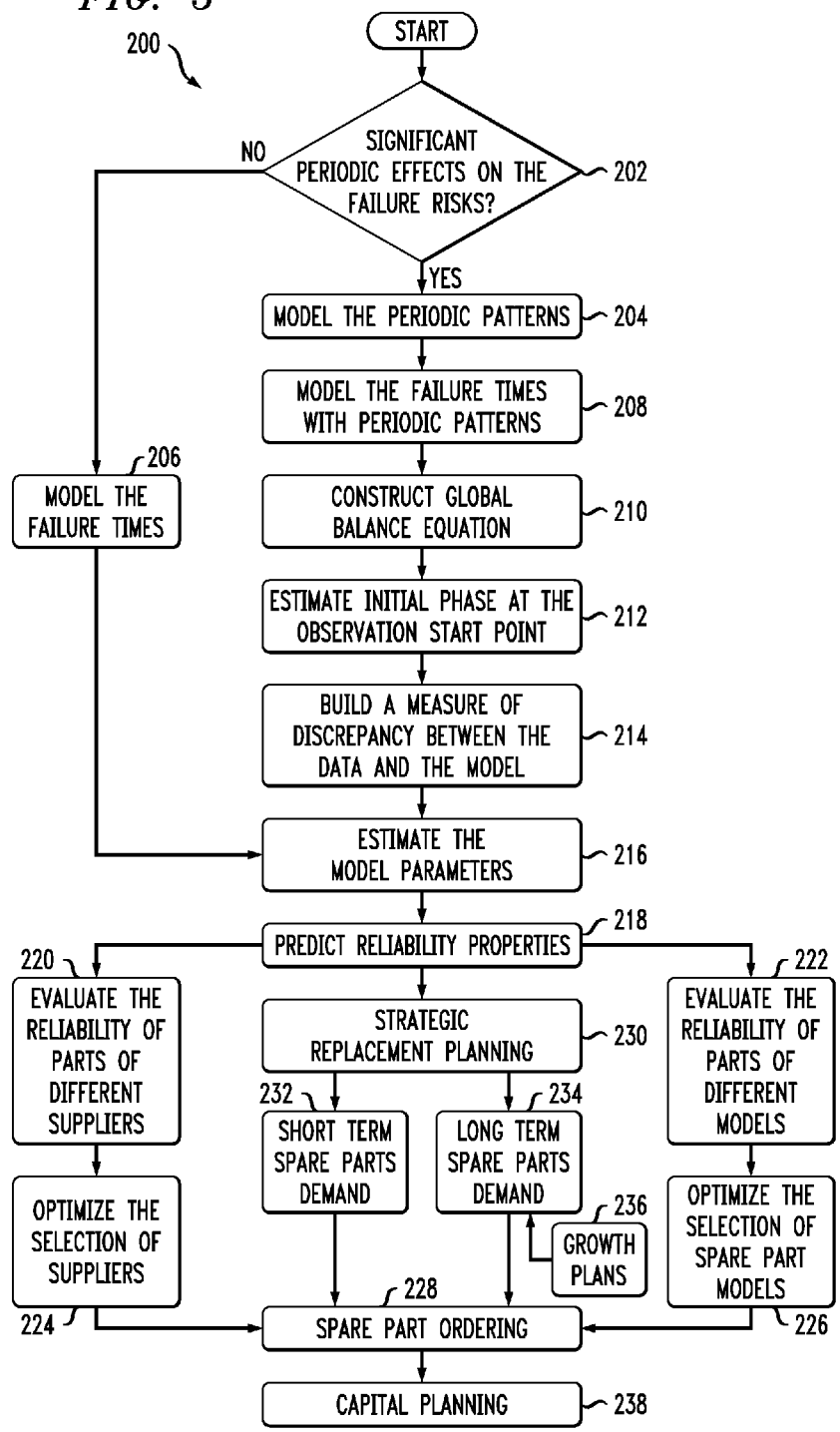
FIG. 5 is a flow diagram of a method for failure prediction and maintenance planning according to an exemplary embodiment of the invention.

FIG. 4 depicts a system diagram that illustrates a failure prediction and maintenance planning system 100. The system 100 predicts a subsequent failure of equipment from prior failure data of that equipment in connection with environmental and/or operational conditions collected during a time duration, e.g., an observation window. FIG. 5 depicts a flow chart that illustrates method steps for predicting a subsequent failure of equipment from prior failure data of that equipment collected in connection with environmental and/or operational conditions collected during a time duration, and maintenance planning. According to an embodiment, the collected prior failure data comes from, for example, water pipe failure data and environmental and/or operational conditions of a region, such as Washington D.C. or Cambridge, Canada. The environmental conditions may be, for example, temperature as described in connection with FIG. 2. The prior failure data collected from each different resource may have a different time duration for which the prior data was collected (e.g., 7 years in the case of Washington, D.C. and 23 years in the case of Cambridge, Canada.

As shown in FIG. 4, the failure prediction and maintenance planning system 100 includes, but is not limited to, a failure prediction and maintenance planning module 101, a data center 102, which receives and stores a variety of collected information, including but not limited to item attributes 104, such as diameter, length and material, operational conditions 106, such as pressure and soil type, failure records 108, including dates of failure events, spare parts inventory and suppliers 110, unstructured data 112, and a growth plan for the region 114.

The system 100 further includes a statistical modeling module 120, which uses the collected prior failure data of the equipment in connection with environmental and/or operational conditions from the data center 102 to predict subsequent failures. The statistical modeling module 120 includes, but is not limited to, periodic impact evaluation and modeling modules 122, 123, a failure time distribution modeling module 124, a global balance equation systems module 125, an initial phase estimation module 126 and a discrepancy measure module 128.

Referring, for example, back to FIG. 3, the periodic impact evaluation module 122 identifies the periodic effects on failure risk based on a Fourier transformation of failure intensity. In this case, the result is the single peak at the frequency of 1 cycle/year showing a high occurrence of failure at one point during the year. Then, the periodic impact modeling module 123 models the periodic patterns using a Fourier series as in the following equation (1):

$$z(t) = B + \sum_{v=1}^{\infty} A_v \sin(2\pi v t / \tau + \theta_v), \quad (1)$$

$$A_v \geq 0,$$

$$\theta_v \in [0, 2\pi)$$

In equation (1), t is time, $\tau$ denotes the duration of a cycle, $\theta_v$ is the initial phase of the vth periodic component and v indexes the periodic components. $A_v$, B and $\theta_v$ are unknown parameters, which are estimated through additional calculations as described further below. If, for example, the pattern is a single periodic component, so that v is equal to 1, then equation (1) becomes:

$$z(t)=B+A_1 \sin(2\pi t/\tau+\theta_1) \quad (2)$$

The failure time distribution modeling module 124 models the hazard rate (i.e., the rate of occurrence of failures) with the periodic patterns according to the following equation (3):

$$h_k(t)=(t-t_{k-1})^\gamma \exp[\beta^T x+z(t)], t \in [t_{k-1}, t_k) \quad (3)$$

According to equation (3), $t-t_{k-1}$ denotes a functional time, i.e., a time that a component of equipment or the equipment itself is in operation, between the (k−1)th and kth failures. x denotes a vector of explanatory variables, $\beta$ and $\gamma$ are unknown parameters which are estimated using additional calculations as described further below.

Since the history prior to the observation window is not known, the global balance equation systems module 125 constructs global balance equations, and the initial phase estimation module 126 estimates the unknown initial phase prior to the observation window. The global balance equations are constructed with respect to the phases of the failure times according to the following equation (4):

$$\eta_s(\phi) = \int_0^\tau \sum_{m=0}^{\infty} f(\phi - \theta + m\tau | \theta) \eta_s(\theta) d\theta, \quad (4)$$

$$\phi, \theta \in [0, \tau)$$

In equation (4), $\theta$ and $\phi$ denote the phase at failure time $T_{k-1}$ and $T_k$, respectively, $\eta_s(\cdot)$ denotes the stationary probability density function (pdf) of the phase at time of failure, $f(\cdot|\theta)$ denotes the pdf of the phase at $T_{k+1}$ given the phase at $T_k$ equals $\theta$ (and is independent of k).

Under steady-state conditions, the phases of subsequent failures along a recurrence process form a Markov process, wherein predictions for the future of the process can be based solely on the present state, without knowing the full history of the process. A balance equation is an equation that describes the probability flux associated with a Markov chain in and out of a state or a set of states. In principle, a set of balance equations can always be solved to give the equilibrium distribution of a Markov chain. As such, in accordance with embodiments of the present invention, a balance equation is solved to find the phase of the last failure time before the observation window. The phase value is used by the failure time distribution module 124 when modeling the hazard rate.

With respect to the following equation (5), the unknown initial phase prior to the observation window is estimated, and, in connection with equation (4), the distribution of phase $\eta_s(\bullet)$ can be estimated by $$\eta_s(\theta) = \int_{-\infty}^{\theta} f(\theta - u|u)\eta_s(u\% \tau) du \quad (5)$$

where % represents modulo operation.

The discrepancy measure module 128 constructs a measure of discrepancy, e.g., likelihood function, between the actual observed data and the model according to the following equations (6) and (7), which illustrate the total likelihood:

$$L_r\{t_1, \ldots, t_k | \Theta\} = g(t_1)\left[\prod_{k=2}^{K} f(t_k | t_{k-1})\right] R(w|t_K) \quad (6)$$

$$L\{d | \Theta\} = \prod_{r=1}^{M_1} L_r\{K(w) = 0 | \Theta\} \prod_{r=1}^{M_2} L_r\{t_1, \ldots, t_k | \Theta\} \quad (7)$$

Equation (6) represents the likelihood of windows with at least one failure event, and equation (7) represents the total likelihood of all the windows.

An empty window is represented by $$L_r\{K(w) = 0 | \Theta\} = 1 - G(w) \quad (8)$$

with K events in the window at times is $t_1, \ldots t_K$. $R(\bullet)$ denotes the survival function and is given by $R(t|u) = \exp[(-\int_u^t (t_1 - u)^\gamma \exp\{\beta^T x + z(t_1)\} dt_1]$; $f(t|u)$ denotes the pdf of the failure time distribution and is given by the negative derivative of $R(t|u)$; $M_1$ and $M_2$ denote the number of empty windows and windows with failure events, respectively;
d and $\Theta$ denote the observed data sets and unknown parameters to be estimated, respectively;
w is the window length; $G(\bullet)$ denotes the cumulative density function (cdf) of the first failure time within the window, and is given by $$G(t) = 1 - \frac{\int_{-\infty}^{0} R(t|u)\eta_S(u\%\tau) du}{\int_{-\infty}^{0} R(o|u)\eta_S(u\%\tau) du};$$

$g(\bullet)$ is the derivative of $G(\bullet)$, i.e., the pdf of the first failure time within the window.

According to an embodiment, the parameters $A_1$, B, $\gamma$, $\beta_1$, $\beta_2$ and $\theta_1$ of the failure time distribution and the periodic patterns can be estimated by evaluating the likelihood function. An example of parameter estimation is illustrated by the following Table 2.

TABLE 2

| Parameters | $\hat{\gamma}$ | $\hat{B}$ | $\hat{A}_1$ | $\hat{\theta}_1$ | $\hat{\beta}_1 \times 10^{-3}$ | $\hat{\beta}_2 \times 10^{-3}$ |
|---|---|---|---|---|---|---|
| Point estimate | .86 | −5.76 | .94 | 1.29 | −2 | 7 |
| (95% CI) | \|.80, .92\| | \|−6.12, −5.40\| | \|.88, 1.00\| | \|1.20, 1.38\| | \|−3.4, −0.6\| | \|6.3, 7.7\| |
| Point estimate | .90 | −5.37 | — | — | −4 | 8 |
| (95% CI) | \|.84, .96\| | \|−5.74, −5.00\| | — | — | \|−5.5, −2.5\| | \|7.4, 8.6\| |

The second and third rows of Table 2 show the maximum likelihood estimate (MLE) of unknown parameters $\Theta = [\gamma, B, A_1, \theta_1, \beta_1, \beta_2]$ and their 95% confidence intervals. The shape parameter $\gamma = 0.86$, so the hazard rate of the functional time distribution is increasing. The value $\hat{\theta}_1 = 1.29$ indicates that the maximum hazard rate occurs at $$t_{max} = \frac{2k\pi + \pi/2 - 1.29}{2\pi} = k + 0.045,$$

k=0, 1, 2, . . . which is, in this case, the middle of January. Based on the frequency and the phase value, we could interpret this periodic impact as the yearly change of air temperature. The air temperature is approximately the lowest between January and February in Cambridge, Canada (Meoweather, 2012). $\hat{A}_1 = 0.94$ represents the periodic impact on the pipe failure. Cambridge has a relatively temperate climate among Canadian cities. For other places, the temperature impact on pipe failure might be severer. $\hat{\beta}_1$ and $\hat{\beta}_2$ are the covariate values associated with pipe diameter and length, which indicate that pipe length has more impact than diameter on the pipe failure. The last two rows of Table 2 show the point and interval estimates of the model parameters when we ignore the periodic term, i.e. without $[\hat{A}_1, \theta_1]$.

Figure 6:
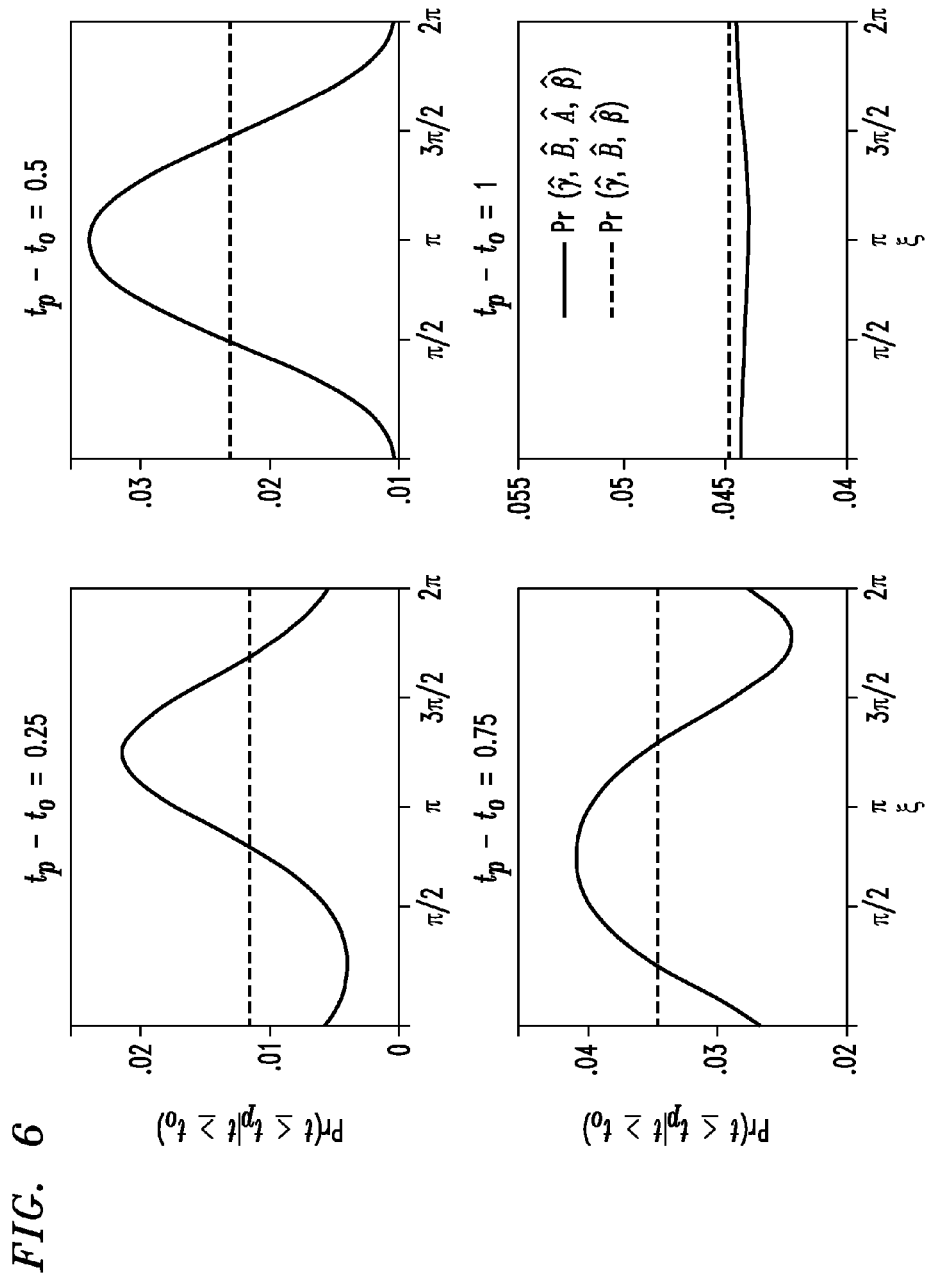
FIG. 6 illustrates graphs of probability of failure at a time tp versus initial phase, and the impact of ignoring periodic terms on failure probability estimation according to an exemplary embodiment of the invention.

Referring to FIG. 6, which illustrates graphs of probability of failure at a time $t_p$ given that a pipe has survived at time $t_o$ ($t_o$=23 years) versus initial phase, the impact of ignoring the periodic terms on failure probability estimation is shown. The estimations with and without $[\hat{A}_1, \theta_1]$ are shown as the solid and dot-dashed lines, respectively. The failure probabilities of the pipe estimated with and without the periodic term at a given age are much different. This can affect the type of the pipes to order in spare part control and the replacement decision regarding an individual pipe.

Referring back to FIG. 4, the statistical modeling module 120 sends the resulting failure prediction data from the periodic impact evaluation and modeling modules 122, 123, failure time distribution modeling module 124, global balance equation systems module 125, initial phase estimation module 126 and discrepancy measure module 128 to the failure prediction and maintenance planning module 101.

The system 100 further includes a computing and optimization module 130, which includes, but is not limited to, a dynamic programming module 132, a stochastic programming module 133, a nonlinear programming module 134, a heuristics algorithm module 136 and a Markov Chain Monte Carlo (MCMC) module 138. The computing and optimization module 130 uses one or more of the modules 132, 133, 134, 136 and 138 to optimize the data sent to the failure prediction and maintenance planning module 101 by the data center 102 and the statistical modeling module 120.

The system 100 further includes a capital planning module 140, a short and long term spare parts demand module 150, and a maintenance planning and scheduling module 160, which use the optimized failure data, and optimized data from the data center 102, such as spare parts and supplier data 110 and growth plan data 114 to develop appropriate capital plans, spare parts ordering strategies, and maintenance schedules based on the data.

For example, referring to Tables 3 and 4, maintenance planning and spare parts ordering can be based on the levels of failure probability and failure impact, as well as predetermined item attributes, to develop a ranking system of the highest priority areas for maintenance and a timeline for the ordering of spare parts.

TABLE 3

Maintenance Planning

| Pipe ID | Failure probability in t' | Failure impact | Ranking | Diameter | Length | Material |
|---------|---------------------------|----------------|---------|----------|--------|----------|
| 3014193 | 0.037 | 2 | 0.074 | 150 mm | 8 m | CI |
| 3014193 | 0.025 | 6 | 0.15 | 150 mm | 10 m | CI |
| 3014193 | 0.049 | 9 | 0.441 | 200 mm | 8 m | PVC |
| 3015465 | 0.1 | 1 | 0.1 | 400 mm | 120 m | DI |
| ... | ... | ... | ... | ... | ... | ... |

TABLE 4

Spare Parts Ordering

| Supplier ID | Model | 1st quarter | 2nd quarter | 3rd quarter | 4th quarter | Diameter | Length | Material |
|-------------|-------|-------------|-------------|-------------|-------------|----------|--------|----------|
| 193 | MS | 5 | 0 | 0 | 2 | 150 mm | 8 m | CI |
| 141 | KT | 0 | 7 | 0 | 0 | 150 mm | 10 m | CI |
| 419 | MS | 10 | 0 | 0 | 0 | 200 mm | 8 m | PVC |
| 465 | KT | 1 | 15 | 0 | 0 | 400 mm | 120 m | DI |
| ... | ... | ... | ... | ... | ... | ... | ... | ... |

Referring to FIG. 5, a failure prediction and maintenance planning method 200 is illustrated. At block 202, the process queries whether there are significant periodic effects on the failure risk. Referring, for example, back to FIG. 3, at this step, the periodic effects on failure risk are identified based on a Fourier transformation of failure intensity. A "yes" result at block 202, indicates a peak at a given frequency showing a high occurrence of failure at regular point(s) during a given time period. A "no" result at block 202 indicates no significant pattern of failure due to factors such as environmental and/or operational conditions.

If no, the process proceeds to block 206, where the failure times are modeled. If yes, the process proceeds to block 204, where the periodic patterns are modeled using a Fourier series using the previously referenced equation (1). The process continues to block 208, where the failure times are modeled with the periodic patterns using the previously referenced equation (3), block 210, where the global balance equation is constructed using the previously referenced equation (4), block 212, where the initial phase at the observation start point is estimated using the previously referenced equation (5), and block 214, where a measure of discrepancy between the data and the model (likelihood function) is built using the previously referenced equations (6), (7) and (8). From block 214 or 206, the model parameters are estimated at block 216. If from 214, the model parameters are estimated using the results from blocks 210, 212 and 214. If from 210, the model parameters are estimated using conventional methods.

Once the model parameters are estimated at block 216, the resulting failure data can be used to predict reliability of the equipment at block 218, which, according to an embodiment, leads to further evaluation of the reliability of parts from different suppliers and/or parts of different models (blocks 220, 222), optimization of the selection of suppliers and/or spare part models (blocks 224, 226), and ordering of spare parts (block 228) based, at least in part, on the results of blocks 220, 222, 224 and 226.

According to an embodiment, predicting the reliability of the equipment at block 218 based on the resulting failure data can also lead to strategic planning of equipment replacement (block 230), resulting in determining short and long term spare parts demand (blocks 232, 234), and ordering of spare parts (block 228) based, at least in part, on the results of blocks 230, 232 and 234. According to an embodiment, growth plans (block 236) can also be part of the spare parts demand analysis, and factored into spare parts ordering. According to an embodiment, the method 200 leads to capital planning at block 238, which takes into account the needs outlined by the previous blocks to determine anticipated expenditures and budgets.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 3-6 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 7:
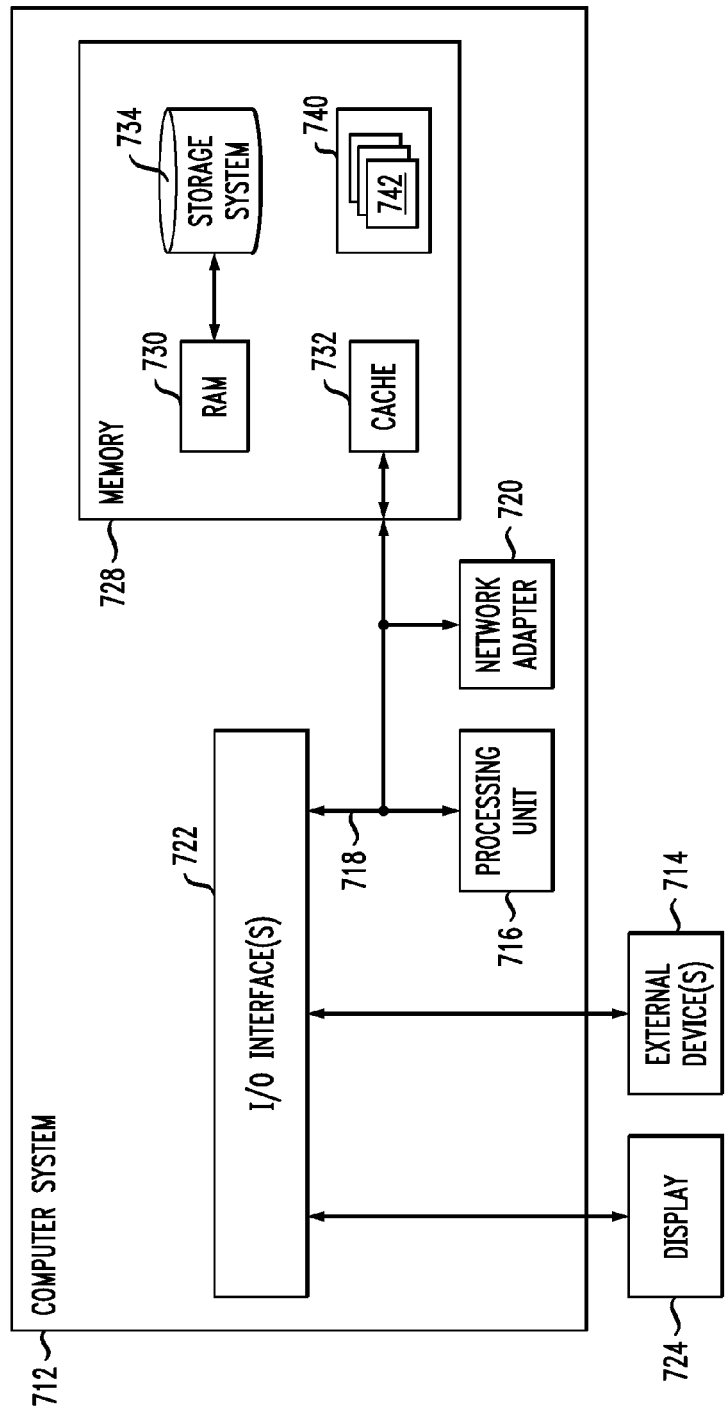
FIG. 7 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for failure prediction for equipment subject to periodically varying failure risk, comprising:
   a memory and at least one processor coupled to the memory;
   a data center, which executes via the at least one processor and receives collected prior failure data of the equipment in connection with at least one of an environmental condition and an operating condition, wherein the collected prior failure data was collected during a time period excluding a portion of a failure history of the equipment; and
   a statistical modeling module, which executes via the at least one processor, is operatively coupled to the data center and comprises:
      a periodic impact evaluation module, which executes via the at least one processor and identifies periodic effects on the failure risk corresponding to the time period excluding the portion of the failure history of the equipment;
      a balance equation systems module, which executes via the at least one processor and constructs balance equations with respect to phase values of failure times, wherein:
         the phase values represent a phase at respective failure times during a time period that the equipment is in operation; and
         the phase values are elements of a set corresponding to a duration of a cycle;
      an initial phase estimation module, which executes via the at least one processor and estimates, based on the balance equations, an unknown initial phase value at a start of the time period excluding the portion of the failure history of the equipment; and
      a failure time distribution module, which executes via the at least one processor and uses the estimated initial phase value when predicting a subsequent failure time distribution of the equipment;
   wherein the balance equations are constructed according to the following equation:

$$\eta_s(\phi) = \int_0^\tau \sum_{m=0}^{\infty} f(\phi - \theta + m\tau \mid \theta) \eta_s(\theta) \, d\theta, \phi, \theta \in [0, \tau);$$

and
   wherein, $\theta$ and $\phi$ denote a phase at failure time $T_{k-1}$ and $T_k$, respectively, $\eta_s(\cdot)$ denotes a probability density function of the phase at time of failure, $f(\cdot \mid \theta)$ denotes a probability density function of the phase at $T_{k+1}$ given the phase at $T_k$ equals $\theta$ and is independent of k, and $\tau$ denotes the duration of a cycle.

2. The system of claim 1, wherein the statistical modeling module further comprises a periodic impact modeling module, which executes via the at least one processor and models periodic patterns using a Fourier series.

3. The system of claim 2, wherein the failure time distribution modeling module models a hazard rate with the periodic patterns and uses the estimated initial phase value when modeling the hazard rate.

4. The system of claim 2, wherein the statistical modeling module further comprises a discrepancy measure module, which executes via the at least one processor and constructs a measure of discrepancy between actual and modeled failure times.

5. The system of claim 4, wherein parameters of the periodic patterns are estimated by evaluating the measure of discrepancy.

6. The system of claim 1, wherein the periodic effects are identified based on a Fourier transformation of failure intensity.

7. The system of claim 1, wherein the periodic effects are due to at least one of the environmental or operational conditions collected during the time period.

8. The system of claim 7, wherein the unknown initial phase value is a phase value of a last failure time before the time period.

9. The system of claim 1, further comprising an optimization module, which executes via the at least one processor, is connected with the statistical modeling module and receives failure prediction data from the statistical modeling module.

10. The system of claim 9, wherein the optimization module optimizes the failure prediction data, and wherein the optimization module outputs the optimized failure prediction data for transmission to at least one of a capital planning module, a spare parts demand module, and a maintenance scheduling module.

11. The system of claim 1, further comprising an optimization module connected with the data center, wherein the optimization module executes via the at least one processor, optimizes data from the data center, and outputs the optimized data for transmission to at least one of a capital planning module, a spare parts demand module, and a maintenance scheduling module.

12. The system of claim 11, wherein the data from the data center includes at least one of spare parts data, supplier data and growth plan data.

13. The system of claim 1, further comprising an optimization module connected with the statistical modeling module and the data center, wherein the optimization module executes via the at least one processor, and performs at least one of dynamic programming, stochastic programming, non-linear programming, heuristics algorithm processing and Markov Chain Monte Carlo processing on failure prediction data from the statistical modeling module and on data from the data center.

14. An article of manufacture comprising a non-transitory computer readable storage medium comprising program code tangibly embodied thereon, which when executed by a computer, performs method steps for failure prediction for equipment subject to periodically varying failure risk, the method steps comprising:
receiving collected prior failure data of the equipment in connection with at least one of an environmental condition and an operating condition, wherein the collected prior failure data was collected during a time period excluding a portion of a failure history of the equipment;
identifying periodic effects on the failure risk corresponding to the time period excluding the portion of the failure history of the equipment and modeling periodic patterns;
modeling failure times with the periodic patterns;
constructing balance equations with respect to phase values of the failure times, wherein:
the phase values represent a phase at respective failure times during a time period that the equipment is in operation; and
the phase values are elements of a set corresponding to a duration of a cycle;
estimating, based on the balance equations, an unknown initial phase value at a start of the time period excluding the portion of the failure history of the equipment; and
using the estimated initial phase value when predicting a subsequent failure time distribution of the equipment;
wherein the balance equations are constructed according to the following equation:

$$\eta_s(\phi) = \int_0^\tau \sum_{m=0}^\infty f(\phi - \theta + m\tau \mid \theta)\eta_s(\theta)\,d\theta, \phi, \theta \in [0, \tau);$$

and
wherein, $\theta$ and $\phi$ denote a phase at failure time $T_{k-1}$ and $T_k$, respectively, $\eta_s(\cdot)$ denotes a probability density function of the phase at time of failure, $f(\cdot\mid\theta)$ denotes a probability density function of the phase at $T_{k+1}$ given the phase at $T_k$ equals $\theta$ and is independent of k, and $\tau$ denotes the duration of a cycle.

15. An apparatus for failure prediction for equipment subject to periodically varying failure risk, comprising:
a memory; and
a processor coupled to the memory and configured to execute code stored in the memory for:
receiving collected prior failure data of the equipment in connection with at least one of an environmental condition and an operating condition, wherein the collected prior failure data was collected during a time period excluding a portion of a failure history of the equipment;
identifying periodic effects on the failure risk corresponding to the time period excluding the portion of the failure history of the equipment and modeling periodic patterns;
modeling failure times with the periodic patterns;
constructing balance equations with respect to phase values of the failure times, wherein:
the phase values represent a phase at respective failure times during a time period that the equipment is in operation; and
the phase values are elements of a set corresponding to a duration of a cycle;
estimating, based on the balance equations, an unknown initial phase value at a start of the time period excluding the portion of the failure history of the equipment; and
using the estimated initial phase value when predicting a subsequent failure time distribution of the equipment;
wherein the balance equations are constructed according to the following equation:

$$\eta_s(\phi) = \int_0^\tau \sum_{m=0}^\infty f(\phi - \theta + m\tau \mid \theta)\eta_s(\theta)\,d\theta, \phi, \theta \in [0, \tau);$$

and
wherein, $\theta$ and $\phi$ denote a phase at failure time $T_{k-1}$ and $T_k$ respectively, $\eta_s(\cdot)$ denotes a probability density function of the phase at time of failure, $f(\cdot\mid\theta)$ denotes a probability density function of the phase at $T_{k+1}$ given the phase at $T_k$ equals $\theta$ and is independent of k, and $\tau$ denotes the duration of a cycle.

* * * * *